Oct. 13, 1931.  J. F. LINCOLN ET AL  1,827,245
ARC WELDING
Original Filed March 20, 1922  4 Sheets-Sheet 2
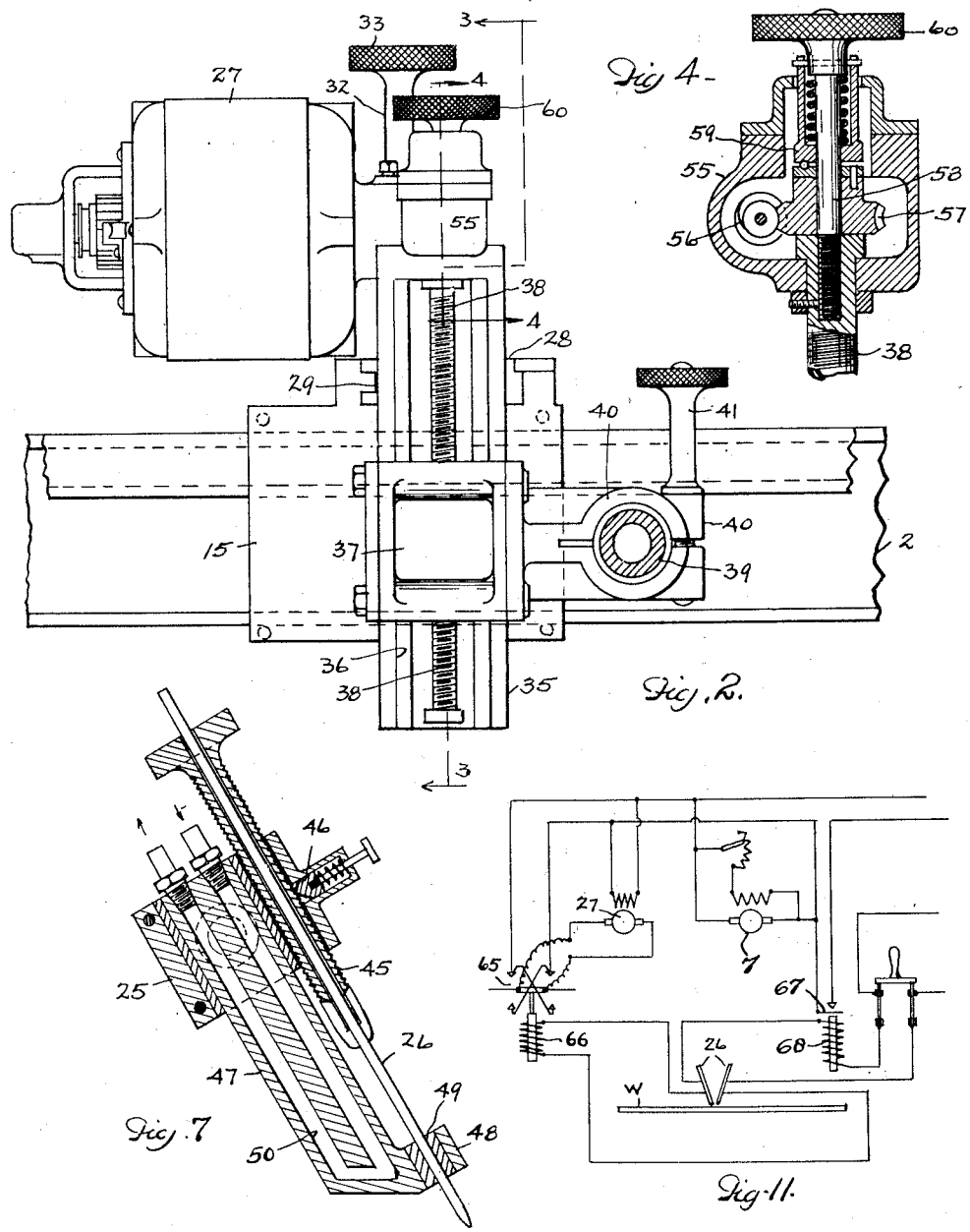
INVENTORS
James F. Lincoln and
Cecil C. Peck
BY Fay, Oberlin & Fay
ATTORNEYS Oct. 13, 1931.  J. F. LINCOLN ET AL  1,827,245
ARC WELDING
Original Filed March 20, 1922  4 Sheets-Sheet 3
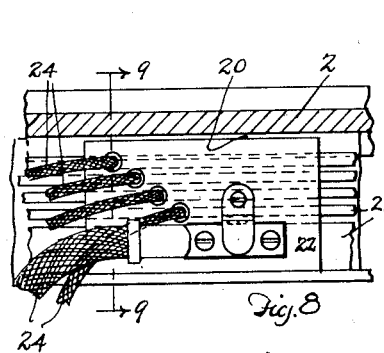
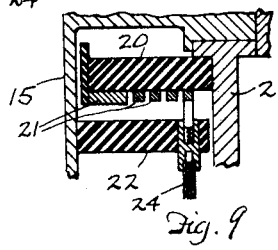
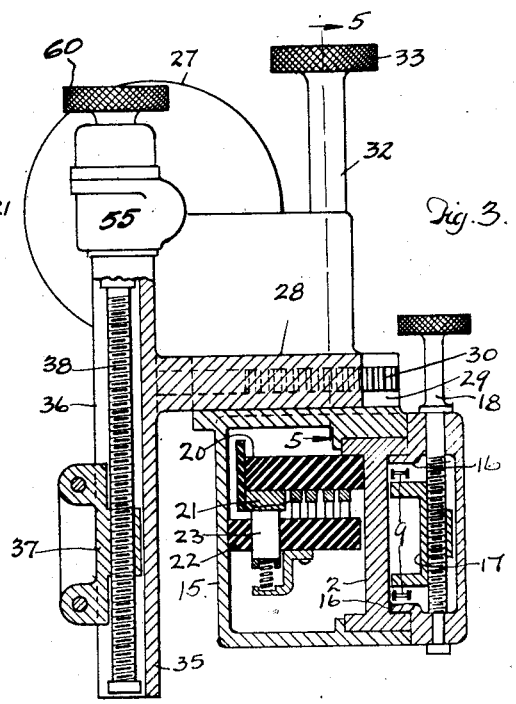
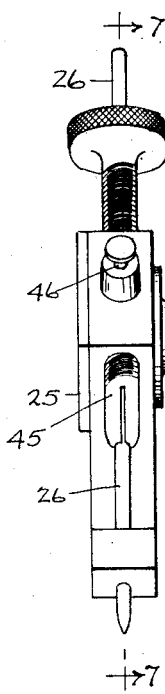
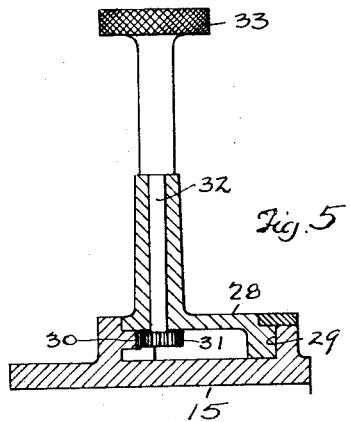
INVENTORS
James F. Lincoln and
Cecil C. Peck.
BY
Fay, Oberlin & Fay
ATTORNEYS

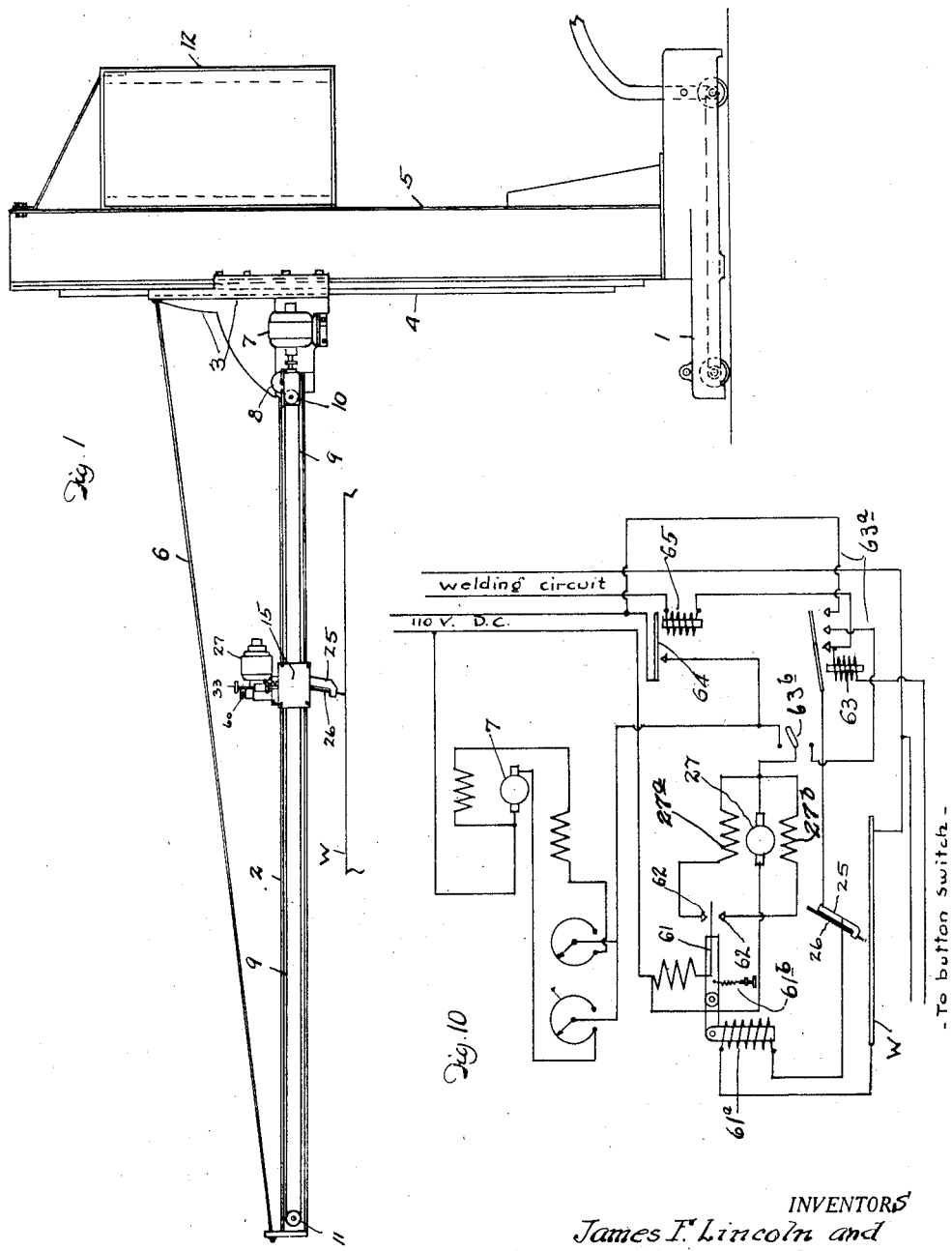

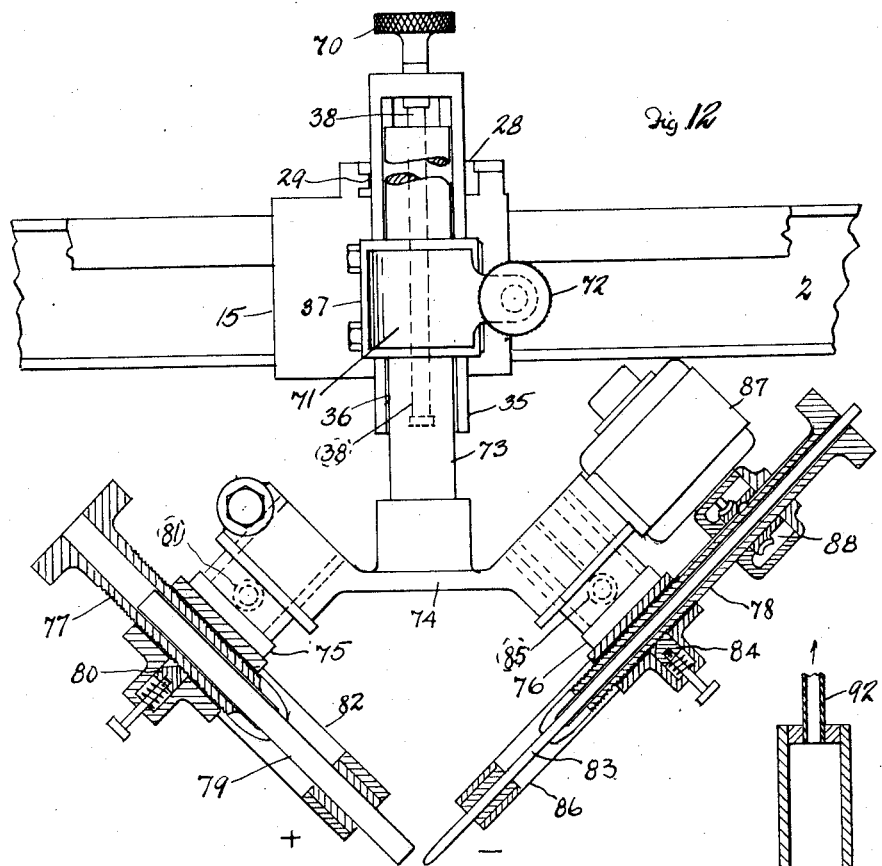
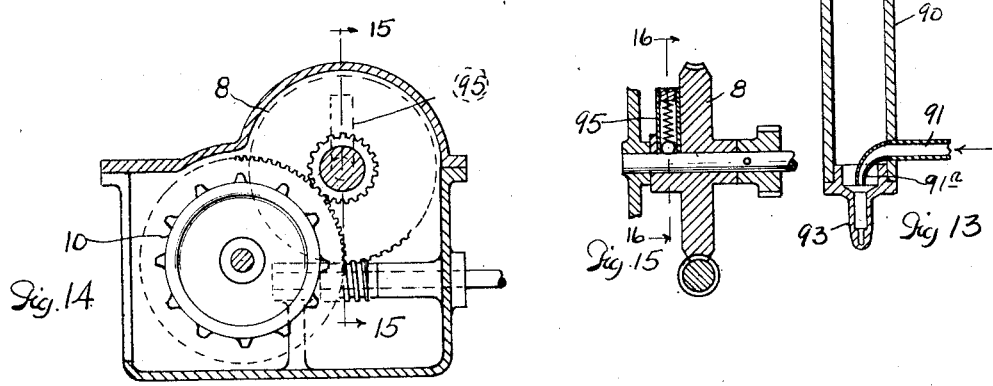
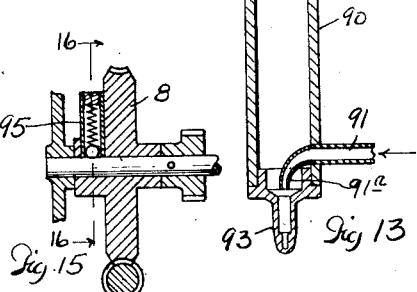
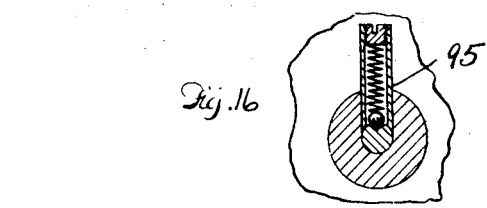

Patented Oct. 13, 1931

1,827,245

UNITED STATES PATENT OFFICE

JAMES F. LINCOLN, OF EAST CLEVELAND, AND CECIL C. PECK, OF CLEVELAND, OHIO, ASSIGNORS TO THE LINCOLN ELECTRIC COMPANY, OF CLEVELAND, OHIO, A CORPORATION OF OHIO

ARC WELDING

Application filed March 20, 1922, Serial No. 545,123. Renewed September 8, 1928.

The present improvements, relating, as indicated, to the art of arc welding, have more particular regard to a method and apparatus for use in welding together light gauge metal sheets, particularly in the form of a continuous seam. Considerable difficulty has been encountered where it has been attempted to weld together such sheets, using an electric arc in contradistinction to so-called resistance methods of welding. In a prior application of James F. Lincoln, one of the applicants herein, viz., Serial No. 458,263, filed April 4, 1921, there are disclosed certain essential features of a method having as its object the provision of an arc welding process whereby a continuous butt weld may be formed between the meeting edges of sheets of relatively light gauge, although such process, (and the same is equally true of the present one) is not necessarily limited to working with such light gauge materials; and in connection with the process proper we have also disclosed in such prior application a relatively simple form of apparatus and system of wiring whereby the welding operation of such apparatus may be effected in a more or less automatic fashion. Specifically, both the rate of feed of the carbon electrode along the strip or seam to be welded and the vertical feed of such electrode are controlled, in the one case by the amperage of the current through the arc, and in the other by the voltage across such arc.

One object of the present invention is the provision of an apparatus of the sort just described which will embody a number of mechanical improvements facilitating the use of the apparatus in welding a variety of different kinds of work and particularly so-called contour work; another object is an improvement in the method of controlling the feed of the electrode in both of the directions mentioned above so as to render such feed more nearly automatic, as also more satisfactory in character, so far as the results obtained are concerned; and still another object is to control the feed of the electrode towards and from the work so as to enable the apparatus to follow a contour in contradistinction to following a line in a horizontal plane. Along with the foregoing, a number of detailed improvements are comprehended, including a novel mounting or holder for the electrode whereby the welding operation is carried on, a novel form of all metal electrode, etc., all as will be hereinafter fully described and particularly pointed out in the claims, the annexed drawings and the following description setting forth in detail certain means and one mode of carrying out the invention, such disclosed means and mode illustrating, however, but several of the various ways in which the principle of the invention may be used.

In said annexed drawings:—

Fig. 1 is a side elevation of a welding machine or apparatus embodying our present improvements; Fig. 2 is an elevational view of the electrode feed mechanism forming a part of the aforesaid apparatus, the same being viewed from the opposite side of that shown in Fig. 1 and being on a somewhat larger scale; Fig. 3 is a transverse section of such electrode feed mechanism and the support whereon it is carried, the plane of the section being indicated by the line 3—3, Fig. 2; Fig. 4 is a sectional view of a detail of such mechanism, the plane of the section being indicated by the line 4—4, Fig. 2; Fig. 5 is a sectional view of another detail of such feed mechanism, the plane of the section being indicated by the line 5—5, Fig. 3; Fig. 6 is a front elevational view of the electrode holder proper which is carried by the aforesaid feed mechanism; Fig. 7 is a vertical section of such holder, the plane of the section being indicated by the line 7—7, Fig. 6; Fig. 8 is a broken bottom plan view of the support for said feed mechanism and a detail view of the trolley whereby current is carried to such feed mechanism and the electrode holder; Fig. 9 is a transverse section of such support and trolley, the plane of the section being indicated by the line 9—9, Fig. 8; Fig. 10 is a diagram illustrating our improved method of wiring the apparatus; Fig. 11 is a similar diagram illustrating a modified wiring system for said apparatus; Fig. 12 is a view similar to that of Fig. 2, but illustrating a modified construction of electrode holder, wherein two electrodes are employed, between which the arc is formed; Fig. 13 is a sectional view of an all-metal form of electrode which we may substitute for the carbon electrodes shown in the previous figures; and Figs. 14, 15 and 16 are detail views of the driving gear for the cable whereby the carriage that supports the electrode holder is moved along the work, Figs. 15 and 16 being sections taken on the planes indicated by the lines 15—15 and 16—16 on Figs. 14 and 15, respectively.

Our improved welding machine in the form illustrated in Fig. 1 is of portable or semi-portable type, being supported on a truck base 1 so as to permit of the ready movement of the machine about a plant. In operation, moreover, it will frequently be convenient to set up a series of articles to be welded and then to operate upon these successively with the welding machine, the latter being shifted from one to the other by means of such truck, which is constructed so that the rollers may be raised from off the floor when the machine is in use. The welding mechanism proper is carried by a horizontally extending beam 2 that constitutes a trackway, as will presently be described, such beam being attached at its inner end to a bracket-slide 3 that is vertically adjustable on a slideway 4 provided on one face on a column or standard 5 rising from base 1. A tie-rod 6, extending from the upper end of bracket 3 to the outer end of the beam 2 assists in holding the latter rigid under such load as may be imposed thereon. Supported by said bracket, preferably at one side thereof, is an electric motor 7 that is connected through suitable gearing 8 to drive an endless chain or cable 9 disposed along one side of the beam or trackway 2. Said cable passes around two sheaves or pulleys 10 and 11 located at the respective ends of the beam 2, as shown in Fig. 1, and as a result it will be seen that the two parallel portions of such cable will travel in opposite directions alongside the trackway, so that by attaching the welding mechanism proper to one or the other of such portions such mechanism may be caused to travel in either direction along said trackway.

On the opposite side of the column or standard 5 from that to which bracket-slide 3 is attached, a box 12 is supported wherein may be housed the various switches and control devices required for the motor 7 and welding mechanism, as will be presently described.

The beam 2, whereon the welding mechanism proper is supported, is preferably of I-section, as shown in Fig. 3, such welding mechanism being supported on a hollow box-like base 15 that slidably engages the top and bottom flanges of such I-beam, it being understood that the two parts composing such base 15, as shown in cross-section in Fig. 3, are suitably bolted or otherwise held together. The one component part of base 15, (that on the right of beam 2 as shown in said Fig. 3) is provided with inwardly directed flanges 16 that lie, one above, and the other below the two oppositely traveling portions of the cable 9, and a clamp block 17 adjustably mounted in such base portion is adapted, upon rotation of screw 18, to press the one such cable portion or the other against the corresponding flange and thus temporarily attach the base to such cable portion. The result will of course be to cause movement of said base along beam 2 in the same direction as such cable portion thus clamped to the base is moving.

Projecting laterally from the opposite side of the I-beam 2 from that alongside of which the cable 9 is disposed, is a strip 20 of insulating material, to the under side of which are fixedly attached a plurality of conductors 21, the inner ends of which are suitably connected through the control devices housed in box 12 on standard 5 with a source or sources of electric current, as will presently be described. Fixedly housed in a corresponding portion of base 15 is a block 22 of insulating material, in which are mounted a plurality of spring-pressed plungers 23 that have slidable contact with the conductors 21, said contacts being connected, through the medium of flexible leads 24, shown in Fig. 8, with the holder 25 for the welding electrode 26 and with a motor 27 whereby such holder, with the electrode, may be fed towards or from the work.

Both said electrode holder and motor are supported by a plate 28 that is movably held in a slideway 29 formed in the upper portion of base 15, such slideway being disposed transversely of the I-beam 2 so that said plate, it will be seen, is transversely adjustable to the direction of travel of said base. For thus adjustably positioning the supporting plate 28 a rack 30 is provided in conjunction with slideway 29, and a pinion 31, operated by a spindle 32 with a knurled wheel 33 on its projecting end, is provided on slide 28.

A bracket 35, depending from one side of plate 28, is formed with a vertical slideway 36, and a slide 37 adjustable along such slideway, by means of a screw 38 having threaded engagement therewith, is utilized to support the electrode holder 25. Such holder is not, however, directly attached to slide 37, but is provided with a laterally projecting stub-shaft 39 that is oscillatorily adjustable in an arm 40 that projects from said slide, such arm being split to form a clamp wherein shaft 39 is thus held in desired position about its axis of oscillation by tightening clamp screw 41.

The electrode holder is provided with a chuck member 45, wherein the carbon pencil 26, constituting the electrode, is frictionally held, said chuck being externally threaded for engagement by a spring-pressed plunger 46 transversely movably mounted in said holder. By withdrawing this plunger, the chuck may be moved in the holder to approximately desired position and then, for finer adjustment, the plunger having been allowed to engage with the thread on the chuck, the latter is rotated in one direction or the other, as will be readily understood. In addition to the holding means proper thus provided a separate conductor member 47, for supplying the welding current to the electrode, is provided, such member extending parallel with chuck 45, and having an off-set portion 48 at its lower end provided with an interchangeable bushing 49 that is adapted to closely fit the particular pencil being used. Conductor member 47, as clearly shown in Fig. 7, is formed with an interior passageway 50 that extends substantially to its lower end and then returns in reverse direction back to the upper end thereof, whereby a cooling fluid, such as water, for example, may be circulated lengthwise of the same, the inflowing section of such cooling passage being carried as close to the face of member 47 adjacent the electrode as possible. By reason of the foregoing construction the current may be supplied to the electrode closely adjacent to the working end or point thereof and any improper heating such as might affect the free flow of the current is avoided. At the same time every facility is afforded for the ready adjustment of the electrode in the holder.

The importance of conducting the current to the electrode at a point thus closely adjacent to its working end will be apparent when it is recalled that the resistance of such electrode where the carbon varies greatly with change in temperature. The proper control of the current supplied to form the arc hence is exceedingly difficult if it has to pass through a considerable length of carbon electrode. Furthermore, when the latter is highly heated, it burns away rapidly in the air, and has to be prematurely discarded on this account.

By reason of the screw-threaded engagement of the chuck 45 with the holder 25, the former is both rotatably and longitudinally movable in the latter. Aside from the fact that such screw-threaded engagement affords a convenient and easily graduated means for feeding the electrode towards or from the work, it is an additional advantage thus to rotate or revolve the electrode about its axis for this causes the end of the electrode to wear off to a point a great deal better than if the carbon were not thus revolved. In other words, when the electrode or carbon pencil is stationary in this respect, it is very apt to burn with irregular points which cause the arc to blow to a greater extent than it does when revolved from time to time.

The upper end of screw 38, whereby slide 37, and thus the electrode holder, may be raised or lowered with respect to the work, extends into a gear housing 55 adjacent to the driving end of the spindle of motor 27. Such spindle is provided with a worm 56 that meshes with a worm gear 57 and is rotatably secured to the upper end of said screw 38 by means of a spindle 58 of reduced diameter. A clutch 59 serves to normally operatively connect said gear 57 with spindle 58 while leaving the latter, and thereby the screw 38, free to be rotated by means of the knurled wheel 60 on the upper projecting end of said spindle. Said clutch will at the same time over-ride when the slide 37 reaches its lower limit of movement.

So far as the mechanical features of our improved welding machine are concerned, the operation of the machine should be readily understood from the foregoing description. As already explained the machine as a whole is rendered portable by providing the base 1 with truck rollers; and accordingly by shifting said base and raising or lowering trackway 2 the welding mechanism proper may be brought into proper relation with the work W. The latter may consist of two separate plates brought with their edges in abutting relation, or of the opposite portions of a single sheet bent around into circular or other closed form whereby the edges are brought into juxtaposed position. The term "sheets" as used herein is accordingly to be interpreted as including two wholly independent sheets, or parts of a sheet, thus bent around and brought into substantially the same plane. The material of the sheets will of necessity be metal, such as iron or steel, capable of being worked electrically in the fashion described, and in addition a filler strip, either of the same or different metal may be employed as described in the aforesaid co-pending application. We have also found that it is in many cases of great assistance to supply a fluxing material to the joint being welded, such as the usual carbonate; and a purifying ingredient, such as aluminum, may also be advantageously added in proper amount, whereby the metal as it is melted by the arc is clarified of any oxide that may be incidentally formed.

For an understanding of the electrical features of our improved machine attention is directed to the wiring diagram of Fig. 10, from which it will be seen that motor 7, whereby the welding mechanism is fed along the trackway, is a straight field controlled motor. The motor 27, however, by which the electrode holder is raised or lowered, as the case may be, has two shunt fields 27$^a$ and 27ᵇ, to which the supply of current is controlled by a device 61 on the order of a regulator, operated by a solenoid 61ᵃ against an adjustable tension spring 61ᵇ, such device being operated by changes in voltage across the arc. Such regulator has two limits, determined by the contacts 62, 62, the upper limiting contact point being placed, for example, at approximately 38 volts, and the lower limit contact point at approximately 28 volts, said contact points being arranged so that, working through a relay when the voltage across the arc rises to 40, the circuit is closed through one of the fields of motor 27, thereby causing the same to rotate in a direction to feed the carbon down. When, as a result, the voltage across the arc is reduced sufficiently the contact is broken and the motor stopped until the arc again is lengthened to a point where the voltage rise causes a repetition of the operation just described, when the motor will again feed the carbon down. Should the voltage across the arc drop to the lower limit corresponding with the other contact point, the other shunt field is connected up, with the result that the motor is operated in the opposite direction to that referred to above, and the arc correspondingly lengthened until the voltage increases to a point where the volt meter breaks contact with the last-mentioned contact point. It will be understood of course that any desired voltage limits may be set for the control of said motor 27.

The closing of the welding circuit is controlled by a button switch operating a relay 63, and the switch 64, whereby the motors 7 and 27 are thrown into or out of operation, is controlled by a series relay 65, with the result that both said motors will be automatically set in operation when the arc starts, and of course similarly automatically cut out when the arc stops. As shown in Fig. 10, a supplementary shunt 63ᵃ circuit, adapted to be closed by, or simultaneously with the same switch 63 that controls the welding circuit, is provided in order to energize motor 27 the moment said welding circuit is closed, and thus insure the proper setting of the electrode at the very beginning of the operation. A switch 63ᵇ, shown in neutral position, serves when swung downwardly to include the motor in such supplemental circuit 63ᵃ, or when swung upwardly to include same in the first-described circuit. Said switch 63ᵇ is placed in such first-described position when starting and will then be swung to its second position after the operation is under way.

In the illustrative wiring scheme illustrated in Fig. 11 we note in the first place that instead of a single carbon electrode 26 being employed, two such electrodes are utilized, both being connected in the welding circuit instead of only one, and the circuit accordingly does not require to be completed through the work as in the system illustrated in Fig. 10. A suitable double electrode holder for use where two electrodes are thus employed will be found illustrated in Fig. 12, to be described later. We also show in Fig. 11 a different system of control for the motor 27 in that the armature is reversibly connected in a separate D. C. circuit by a reversing switch 65, which latter is operated by means of a solenoid 66 through changes in voltage across the arc. The circuit for motor 27, as well as motor 7, is here controlled as before by a switch 67 adapted to be closed by a solenoid 68.

The double electrode holder illustrated in Fig. 12 is designed to be supported from slide 37 in substantially the same fashion as the previously described single electrode holder, it being understood of course that so far as the electric connections are concerned, the one, i. e. the positive, side of the welding circuit instead of being connected to the work is connected to the positive electrode. In the case where two electrodes are thus employed, the feeding movement thereof towards and from the work cannot be automatically controlled by the voltage across the arc, although if desired, one or both electrodes may be thus moved relatively towards each other, so as to maintain their ends, between which the arc is formed, at all times the proper distance apart.

It will accordingly be noted that in Fig. 12, we omit motor 27 and simply provide a knurled hand-wheel 70 on the upper end of feed-screw 38, whereby the slide 37 is raised or lowered as occasion may require. Furthermore, instead of a clamp-bracket 40 disposed as in Fig. 2, we employ a similar bracket 71 that projects outwardly from said slide, i. e. at right angles to the track-way 2, and that has the opening therein disposed vertically. In adjusted position in such clamp-bracket is held by means of clamp screw 72 a stub-shaft 73 that extends vertically upwardly from the electrode holder 74. The latter carries two oppositely projecting arms 75 and 76 that are rotatably adjustable about downwardly diverging axes, so that the corresponding chuck members 77 and 78 in said arms, which lie at right angles to such axes, will be downwardly convergent. Adjustment of shaft 73, and thus of all the parts just described as being supported therefrom, may be had not only in a vertical direction but also about said shaft as an axis so as to swing the chuck members 77 and 78 into any desired angular position with respect to the track-way 2, as will be evident.

The chuck member 77, shown as holding the positive electrode 79, is substantially the same as member 45 in the single electrode holder, and is adjusted in the same way through the medium of a spring-pressed plunger 80. Electric current supplied to arm 75 through a suitable connection at 81 is conducted as before to a point closely adjacent the lower end of said electrode by a copper conductor-member 82, just as before.

In the case, however, of the other chuck member 78, which holds the negative electrode 83, we provide in addition to corresponding plunger 84, electrical connection 85 and conductor 86, a motor 87 that is adapted to rotate said member 78 through a worm drive 88 and thus automatically feed the same, in the same fashion as motor 27 feeds slide 37 in the first-described construction (Fig. 2). Said motor 87, in other words, will be connected in the wiring diagram of Fig. 10 or 11 in the same manner as motor 27 is there shown. As a consequence, as the lower end of electrode 83 burns off, said electrode will be automatically fed downwardly towards the other electrode, and if desired, the chuck-member 77 carrying the latter may be intergeared with chuck-member 78, so as to feed simultaneously but at a lower rate, as need not be described in detail.

Other than indicated the mode of operation of our improved welding apparatus will be substantially unchanged where a double electrode holder, instead of a single holder, is thus employed.

As hereinbefore indicated, we may in certain cases substitute an all-metal electrode for the carbon electrodes described. Such an all-metal electrode, as shown in section in Fig. 13, will be seen to comprise a body 90 in the form of a hollow tube having inlet and outlet connections 91 and 92, the inlet connection terminating in a downwardly directed nozzle 91ª, whereby water or other cooling fluid may be circulated therethrough, just as in the case of conductors 47, 79 and 86. Removably secured in the lower end of said body portion is a hollow tip 93 from which the arc is sprung. Such all-metal electrode will preferably be supported in a holder in the same fashion as the carbon electrodes previously described. Copper will preferably be the metal employed in such electrode.

In order to guard against damage to the apparatus, should the carriage 15 be accidentally brought to either end of the track-way 2, the transmission gear 8 between motor 7 and sheave or sprocket 10 will desirably include an over-riding clutch 95, as shown in Figs. 14, 15 and 16.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In arc-welding mechanism, the combination of a trackway, a carriage movable therealong, a member mounted on said carriage so as to be movable transversely of said trackway, a reversely operable electric motor on said carriage intergeared with said member to move the same, and an electrode-holder mounted on said member.

2. In an electrode-holder for arc-welding mechanism, the combination of a body-member, a chuck reciprocably mounted in said body-member and adapted to grip an electrode, and a conductor member attached to said body member, said conductor member extending parallel with the electrode and having an offset portion formed with an aperture adapted slidably to embrace the electrode close to the working end thereof.

3. In an electrode-holder for arc-welding mechanism, the combination of a body-member, a chuck reciprocably mounted in said body-member and adapted to grip an electrode, a conductor member attached to said body-member, said conductor member extending parallel with the electrode and having an offset portion formed with an aperture through which the working end of the electrode may project, and an interchangeable bushing in such aperture adapted slidably to embrace the electrode close to the working end thereof.

4. In an electrode-holder for arc-welding mechanism, the combination of a body-member, electrode-gripping means supported on said body member and adapted to hold an electrode in longitudinally reciprocable relation thereto, and a conductor member supported in spaced relation to said body member and adapted to have movable electrical contact with the electrode close to the working end thereof, said conductor member being formed with a reversely disposed passage for circulating a cooling fluid therethrough, such passage extending substantially to such working end of said conductor member.

5. In an electrode-holder for arc-welding mechanism, the combination of a body-member, electrode-gripping means supported on said body member and adapted to hold an electrode in longitudinally reciprocable relation thereto, and a conductor member attached to said body member, said conductor member extending parallel with the electrode and having an offset portion formed with an aperture adapted slidably to embrace the electrode close to the working end thereof, said conductor member being formed with a passage for circulating a cooling fluid therethrough, such passage extending downwardly from the upper end of said member substantially to its lower end and then returning in reverse direction.

6. In an electrode-holder for arc-welding mechanism, the combination of a body-member, electrode-gripping means supported on said body member and adapted to hold an electrode in longitudinally reciprocable relation thereto, and a conductor member attached to said body-member, said conductor member extending parallel with the electrode and having an offset portion formed with an aperture adapted slidably to embrace the electrode close to the working end thereof, said conductor member being formed with a passage for circulating a cooling fluid therethrough, the inflow section of such passage extending downwardly close to the face of said member adjacent the electrode from the upper end of said member substantially to the lower end thereof and such passage then returning in reverse direction.

7. In arc-welding mechanism, an electrode-holder comprising a body-member, a chuck adapted to laterally grip the electrode, said chuck being reciprocably mounted in said body-member and also being exteriorly threaded, and a plunger movably mounted in said body-member and adapted to engage with the thread on said chuck when desired.

8. In arc-welding mechanism, an electrode-holder comprising a body-member, a chuck mounted in said body-member and adapted to grip the electrode, said chuck being movable both rotatably and reciprocably in said body-member, and a conductor member attached to said body-member, said conductor member extending parallel with the electrode and having an offset portion formed with an aperture adapted slidably to embrace the electrode close to the working end thereof.

9. In arc-welding mechanism, an electrode-holder comprising a body-member, a chuck mounted in said body-member and adapted to grip the electrode, said chuck having screw-threaded engagement with said body member, whereby it may be simultaneously rotated and longitudinally advanced therein, and a conductor member attached to said body-member, said conductor member extending parallel with the electrode and having an offset portion formed with an aperture adapted slidably to embrace the electrode close to the working end thereof.

10. In arc-welding mechanism, the combination of a track-way, a carriage movable therealong, an electrode-holder supported on said carriage so as to be oscillatory in an approximately horizontal plane parallel with the direction of travel of said carriage on said track-way, means adapted to secure said holder in desired angular position about its axis of oscillation, and two downwardly convergent electrodes in said holder, said electrodes being angularly adjustable about axes intersecting their own axes.

11. In arc-welding mechanism, the combination of a track-way, a carriage movable therealong, an electrode-holder supported on said carriage so as to be oscillatory in an approximately horizontal plane parallel with the direction of travel of said carriage on said track-way, means adapted to secure said holder in desired angular position about its axis of oscillation, and two downwardly convergent electrodes in said holder, said electrodes being angularly adjustable about axes lying at approximately right angles to their own axes.

12. In an electrode holder for arc-welding mechanism, the combination of a body-member, electrode gripping means supported on said body-member and adapted to hold an electrode in relatively longitudinally reciprocable and rotatable relation thereto, and a conductor member constituting the main current supply for the arc supported in spaced relation to said body member and adapted to have movable electrical contact with the electrode close to the working end thereof.

13. In an electrode holder for arc-welding mechanism, the combination of a body-member, electrode-gripping means supported on said body member and adapted to hold an electrode in relative longitudinally reciprocable and rotatable relation thereto, and a conductor member constituting the main current supply for the arc supported in spaced relation to said body member and formed slidably to embrace the electrode close to the working end thereof.

14. In an electrode holder for arc-welding mechanism, the combination of a body-member, electrode-gripping means supported on said body member and adapted to hold an electrode in relatively longitudinally reciprocable and rotatable relation thereto, and a conductor member constituting the main current supply for the arc attached to said body member, said conductor member extending parallel with the electrode and having an offset portion formed with an aperture adapted slidably to embrace the electrode close to the working end thereof.

15. In an electrode holder for arc-welding mechanism, the combination of a body-member, electro-gripping means supported on said body-member and adapted to hold an electrode in relative longitudinally reciprocable and rotatable relation thereto, and a conductor member supported in spaced relation to said body member and adapted to have movable electrical contact with the electrode close to the working end thereof, said conductor member being formed with a passage for circulating a cooling fluid therethrough.

16. In arc welding mechanism, the combination of a body member, means supported thereon adapted to feed an electrode and rotate such electrode relative to said body member, and a conductor member constituting the main current supply for the arc likewise supported on said body member, said conductor member being adapted to have movable electrical contact with said electrode close to the working end thereof.

17. In arc-welding mechanism employing a carbon electrode, the combination with electrode-holding, rotating and feeding means, of a conductor member constituting the main current supply for the arc, said member being adapted to have contact with said electrode close to the working end thereof.

18. In a method of working metal by electricity, wherein an arc is established between a rotatable electrode and the work, the step which consists in bringing the main current supply for the arc to said electrode close to the working end thereof.

19. In an arc-welding mechanism, the combination of an electric-holder movable towards and from the work, an electric motor intergeared with said holder thus to move the same in either direction, said motor having two shunt fields which upon energization respectively tend to cause the rotor of said motor to rotate in opposite directions, and means controlled by the voltage across the arc for varying the energization of said fields.

20. In arc-welding mechanism, the combination of an electrode-holder movable towards and from the work, an electric motor intergeared with said holder thus to move the same in either direction, said motor having two shunt fields which upon energization respectively tend to cause the rotor of said motor to rotate in opposite directions, and a regulating device on the order of volt-meter connected across the arc and adapted at predetermined upper and lower limits to vary the energization of said fields.

21. In arc-welding mechanism, the combination of a trackway, a carriage movable therealong, a motor connected thus to move said carriage, an electrode-holder mounted on said carriage so as to be movable relatively to the work, a motor intergeared with said holder thus to move the same, switches in the power lines to each of said motors for controlling said motors, respectively, and a relay in series with the welding current circuit controlling both of said switches.

22. In arc-welding mechanism, the combination of means adapted to feed an electrode towards and from the work, a shunt field electric motor connected to operate said feeding means provided with bucking shunt fields, and means controlled by the voltage across the arc for varying the field condition and direction of rotation of said motor and thus the direction of operation of said feeding means.

23. In an electrode-holder for arc-welding mechanism, the combination of a body-member, electrode-gripping means supported on said body-member and adapted to hold a non-melting electrode in longitudinally reciprocable relation thereto, and a conductor member supported in spaced relation to said body member and adapted to have movable electrical contact with the electrode close to the working end thereof, said conductor member being formed with a passage for circulating a cooling fluid therethrough.

24. In arc-welding mechanism, the combination of a track-way, a carriage movable therealong, a member mounted on said carriage so as to be movable transversely of said track-way, an electrode-holder mounted on said member so as to be oscillatory in a plane parallel with the direction of travel of said carriage on said track-way, and means adapted to secure said holder in desired angular position about its axis of oscillation.

25. In electric arc welding mechanism, the combination of a welding electrode, a conductor member constituting the main current supply for the arc engaging said electrode close to the working end thereof, and means for cooling said conductor member.

26. In electric arc welding mechanism, the combination of a welding electrode, a conductor member constituting the main current supply for the arc engaging said electrode close to the working end thereof, and a passage in said conductor member for circulating a cooling medium therethrough.

27. In electric arc welding mechanism, the combination of a welding electrode, means for rotating said electrode, a conductor member constituting the main current supply for the arc engaging said electrode close to the working end thereof, and means for cooling said conductor member.

Signed by us this 17th day of March, 1922.

JAMES F. LINCOLN.
CECIL C. PECK.